US006667454B2

United States Patent
Rigaux

(10) Patent No.: US 6,667,454 B2
(45) Date of Patent: Dec. 23, 2003

(54) APPARATUS AND METHOD FOR SEPARATING AND REPLACING A CAP FROM A SHANK OF A TIP OF A WELDING ELECTRODE

(75) Inventor: Pierre Rigaux, Montreal (CA)

(73) Assignee: Robtex Inc., Montréal (CA)

(*) Notice: Subject to any disclaimer, the term of this patent is extended or adjusted under 35 U.S.C. 154(b) by 0 days.

(21) Appl. No.: 10/133,678

(22) Filed: Apr. 29, 2002

(65) Prior Publication Data

US 2003/0201253 A1 Oct. 30, 2003

(51) Int. Cl.⁷ .................................................. B23K 11/30
(52) U.S. Cl. .................................................... 219/86.8
(58) Field of Search .......................... 219/86.8, 86.1, 219/86.7, 91.2

(56) References Cited

U.S. PATENT DOCUMENTS

| | | | |
|---|---|---|---|
| 3,016,245 A | 1/1962 | Zelewsky | 279/106 |
| 4,794,221 A | 12/1988 | Takabe et al. | 219/86.8 |
| 4,935,595 A | 6/1990 | Fuse | 219/86.25 |
| 5,073,692 A | 12/1991 | Jackson et al. | 219/86.8 |
| 5,387,774 A * | 2/1995 | Boyer et al. | 219/86.33 |
| 5,495,663 A | 3/1996 | Saito | 29/762 |
| 5,734,141 A * | 3/1998 | Voilmy et al. | 219/86.25 |
| 5,767,474 A * | 6/1998 | Shimada | 219/86.8 |

FOREIGN PATENT DOCUMENTS

| | | | |
|---|---|---|---|
| DE | 3427366 | 2/1986 | B23K/11/30 |
| DE | 3515597 | 10/1986 | B23K/11/30 |
| EP | 0267109 | 5/1988 | B23K/11/30 |
| EP | 0667206 | 8/1995 | B23K/11/30 |
| FR | 2761285 | 9/1998 | B23K/11/11 |
| JP | 5-96378 * | 4/1993 | B23K/11/11 |

* cited by examiner

Primary Examiner—M. Alexandra Elve
Assistant Examiner—Kevin P. Kerns
(74) Attorney, Agent, or Firm—Robic

(57) ABSTRACT

Apparatus and method for separating and replacing a cap from a shank of a tip of a welding electrode. The cap and the shank form a peripheral hollow joint that is defined by a recessed end surface of the shank and a back surface of the cap. The apparatus includes a guide frame having a recessed portion sized for receiving the tip of the welding electrode. The apparatus also includes a cap withdrawing tool movably mounted on the guide frame. The tool has two facing wall sections each having a wedge that is inserted in the peripheral hollow joint. The wedge is forced against the back surface of the cap and removes the cap from the shank by means of a driving mechanism that moves the cap withdrawing tool toward the tip of the welding electrode that is engaged in the recessed portion of the guide frame.

20 Claims, 15 Drawing Sheets

APPARATUS AND METHOD FOR SEPARATING AND REPLACING A CAP FROM A SHANK OF A TIP OF A WELDING ELECTRODE

FIELD OF THE INVENTION

The present invention relates to an apparatus and method for separating and replacing a cap from a shank of a tip of a welding electrode.

BACKGROUND OF THE INVENTION

It is known in the art that the electrode caps mounted on shanks of welding robots need to be periodically replaced by new ones because the caps are worn away due to their repeated use. Manually removing the caps is not possible because these are solidly wedged into their shank. Furthermore, the back surface of a cap is typically of only a few millimeters in thickness and therefore a very precise tool must be used.

Known in the art, there is U.S. Pat. No. 4,794,221 (TAKABE) which discloses an apparatus for removing electrode caps. The caps are removed by means of a tool that is inserted in the peripheral hollow joint that is defined between the shank and the cap. The tool is then pivoted downward against the back surface of the cap and the shoulder of the shank. One drawback of this known cap removing tool is that the shoulder of the shank may be damaged and the shank itself be deformed or unaligned as the cap is removed.

Also known in the art, there is U.S. Pat. No. 5,495,663 (SAITO) which discloses an apparatus for removing electrode caps designed to solve the problem of damage to shanks as identified above. The apparatus has two facing shank holders holding the shank from both sides. The apparatus also has electrode cap holders which are moved in a direction parallel to the axis of the shank to remove the cap from the shank by means of tapered sliding surfaces. One drawback of this known cap removing tool is that it requires the use of several components and it therefore does not provide an apparatus and method that can remove a cap from its shank in a simple and efficient manner.

An object of the present invention is therefore to provide an apparatus and method for separating a cap from a welding electrode by means of an apparatus that is simpler and more efficient than those provided in prior art.

SUMMARY OF THE INVENTION

According to the present invention, there is provided an apparatus for separating a cap from a shank of a tip of a welding electrode, said cap and said shank forming a peripheral hollow joint that is defined by a recessed end surface of the shank and a back surface of the cap, the apparatus comprising:

a guide frame having a recessed portion sized for receiving the tip of the welding electrode, said recessed portion extending in a direction perpendicular to said tip and having two facing side walls and an end wall, the side walls having guiding ribs that are inserted in the peripheral hollow joint for guiding the tip of the welding electrode into the recessed portion until the tip of the welding electrode is abutted against the end wall in an engaged position;

a cap withdrawing tool movably mounted on the guide frame, said cap withdrawing tool being movable along a crosswise direction that is perpendicular with respect to both the tip and the recessed portion when the tip of the welding electrode is in the engaged position, said tool having two facing wall sections each having a wedge that is inserted in the peripheral hollow joint when the tool is moved toward the tip of the electrode that is in the engaged position, said wedge being forced against the back surface of the cap for removing the cap from the shank when the tool is moved toward the tip of the electrode; and a driving mechanism coupled to the cap withdrawing tool for moving the cap withdrawing tool toward and away from the tip of the welding electrode along the crosswise direction between an open position where the tip of the electrode is inserted into and removed from the recessed portion of the guide frame and a closed position where the wedge removes the cap from the shank.

According to another aspect of the present invention, there is also provided a method of separating and replacing first and second caps from first and second shanks of first and second tips of welding electrodes, said tips facing each other in a closable clamp arrangement and being held by opposite fingers pivotally mounted on an arm of a welding robot, said caps and said shanks forming first and second peripheral hollow joints that are defined by recessed end surfaces of the shanks and back surfaces of the caps, the method comprising the steps of:

a) inserting the first tip of the first welding electrode of the robot welder, in a first recessed portion of a first guide frame, said first recessed portion extending in a direction perpendicular to said first tip and having two first facing side walls provided with first guiding ribs and a first end wall;

b) guiding the first tip of the first electrode by means of the first guiding ribs of the first side walls that are inserted in the first peripheral hollow joint until the first tip of the first welding electrode is abutted against the first end wall in a first engaged position;

c) detecting that the first tip of the first welding electrode is in the engaged position;

d) moving a first cap withdrawing tool in a closed position, said first tool being mounted on the first guide frame along a first crosswise direction that is perpendicular with respect to both the first tip and the first recessed portion, said first tool having two facing wall sections each having a wedge being inserted in the first peripheral hollow joint and forced against the back surface of the first cap, thereby removing the first cap from the first shank;

e) moving said first cap withdrawing tool in an open position along the crosswise direction and simultaneously actuating an indexing mechanism that moves a first new cap mounted on a first holder of a cap supply drum in a home position;

f) positioning the first and second tips by means of the robot welder in the home position where the first tip is in alignment with the first new cap;

g) closing the first tip against the second tip to insert the first new cap into the first shank of the first tip;

h) inserting the second tip of the second welding electrode, by means of the robot welder, in a second recessed portion of a second guide frame, said second recessed portion extending in a direction perpendicular to said second tip and having two second facing side walls provided with second guiding ribs and a second end wall, said second guide frame being upside down with respect to the first guide frame;

i) guiding the second tip of the electrode by means of the second guiding ribs of the second side walls that are inserted in the second peripheral hollow joint until the second tip of the welding electrode is abutted against the second end wall in a second engaged position;

j) detecting that the second tip of the welding electrode is in the engaged position;

k) moving a second cap withdrawing tool in a closed position, said second tool being mounted on the second guide frame along a second crosswise direction that is perpendicular with respect to both the second tip and the second recessed portion, said second tool having two facing wall sections each having a wedge being inserted in the second peripheral hollow joint and forced against the back surface of the second cap, thereby removing the second cap from the second shank;

l) moving said second cap withdrawing tool in an open position along the crosswise direction and simultaneously actuating the indexing mechanism that moves a second new cap mounted on a second holder of the cap supply drum in the home position;

m) positioning the first and second tips by means of the robot welder in the home position where the second tip is in alignment with the second new cap; and n) closing the second tip against the first tip to insert the second new cap into the second shank of the second tip.

The invention as well as its numerous advantages will be better understood by reading of the following non-restrictive description of a preferred embodiment made in reference to the appending drawings, in which like numerals refer to like elements.

DETAILED DESCRIPTION OF THE INVENTION

Figure 1:
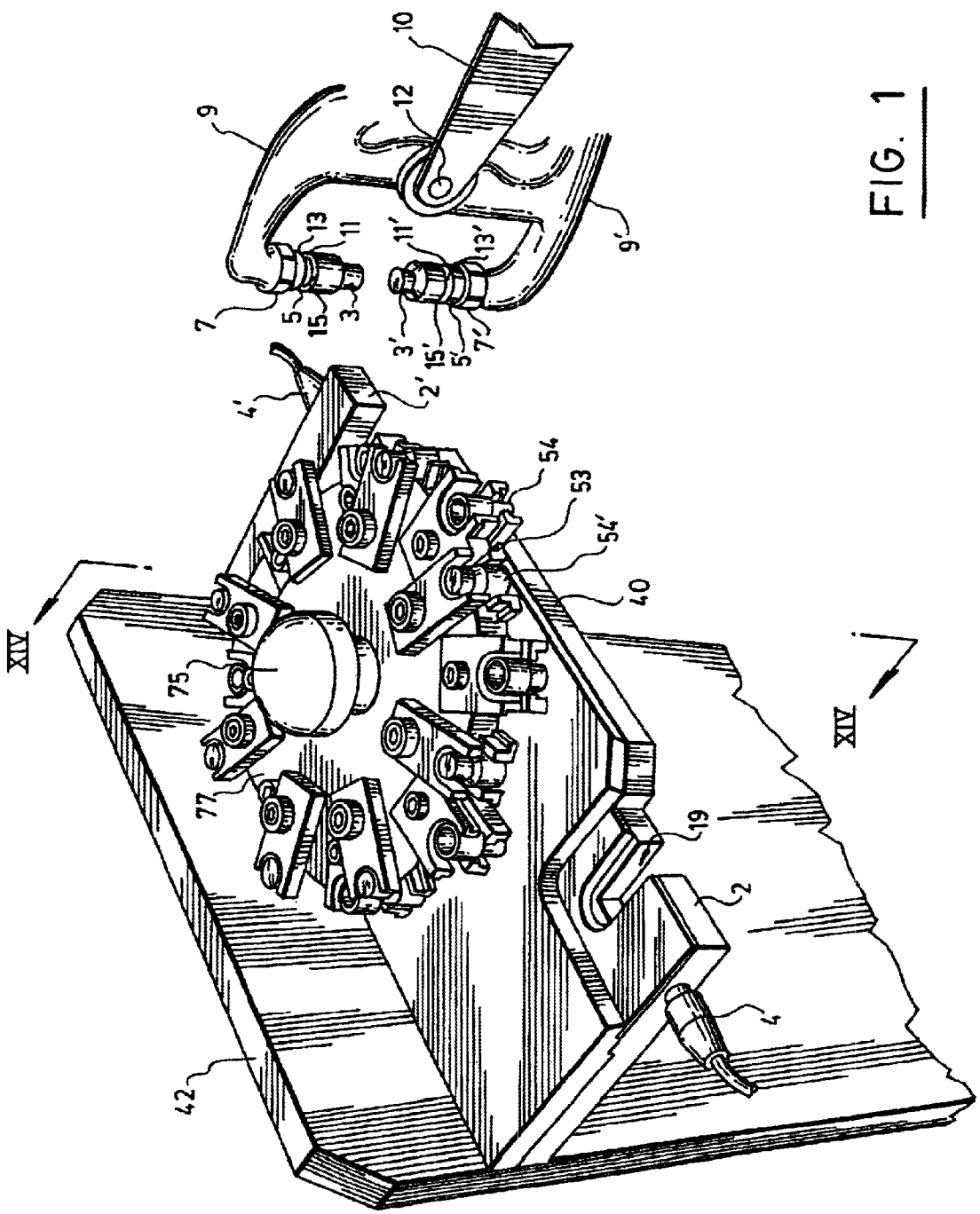
FIG. 1 is a perspective view of an apparatus for separating a cap from a shank of a tip of a welding electrode and for replacing the cap with a new cap, according to a preferred embodiment of the present invention.

Referring to FIG. 1, there is shown a preferred embodiment of an apparatus according to a preferred embodiment of the present invention within the environment in which it operates.

Figure 2:
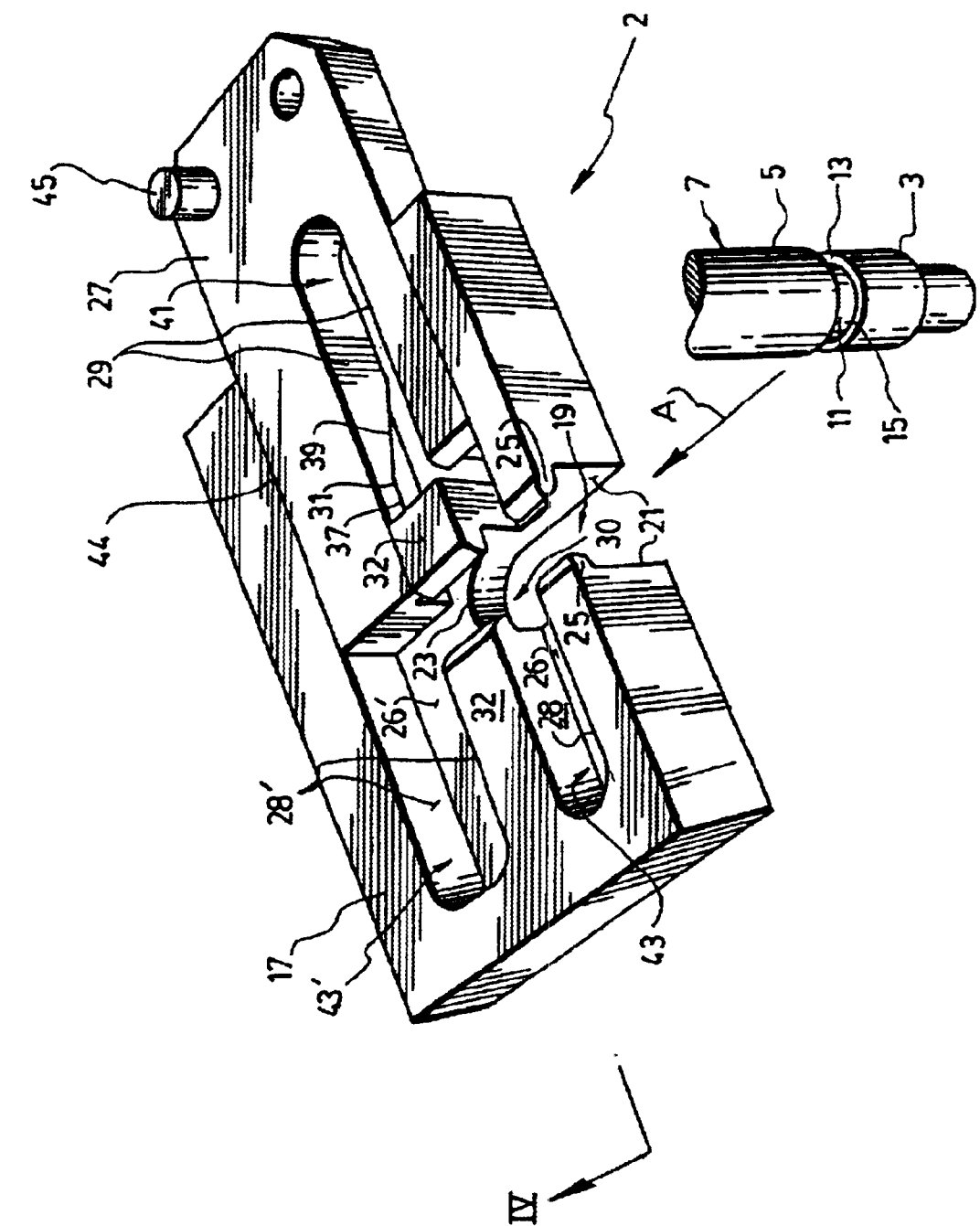
FIG. 2 is a partial perspective view of the tip of a welding electrode to be inserted in a recessed portion of a guide frame with a cap withdrawing tool being in its open position, according to a preferred embodiment of the present invention.

Referring to FIG. 2, the apparatus according to a first aspect of the invention is used for separating a cap 3 from a shank 5 of a tip 7 of a welding electrode. The cap 3 and the shank 5 form a peripheral hollow joint 11 that is defined by a recessed end surface 13 of the shank 5 and a back surface 15 of the cap 3.

Referring back to FIG. 1, a robotic welder, the body of which is not shown, has an arm 10 which preferably holds two fingers 9 and 9' holding the tips 7 and 7' of the welding electrodes that face each other in a closable clamping arrangement. The tips 7, 7' of the welding electrodes are preferably identical to each other. The fingers 9 and 9' are pivotally mounted on a pivot point 12 of the arm 10 so that the robot welder can move them between open and closed positions. It will be understood of course that according to the present invention only one welding electrode may be used instead of the two that are shown.

Figure 4:
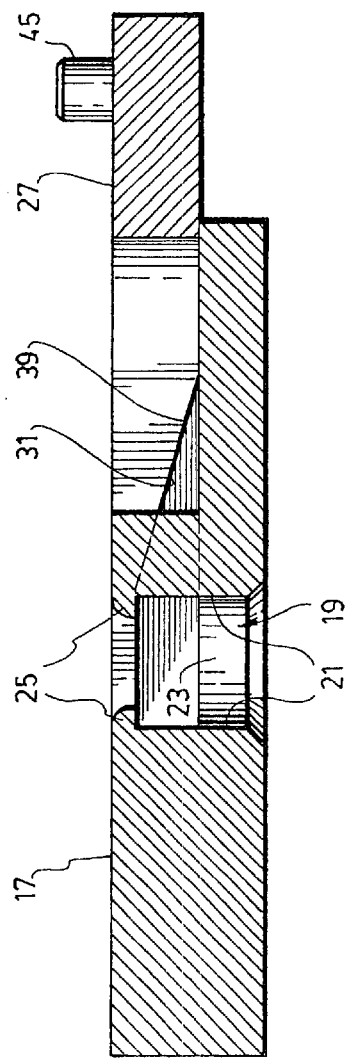
FIG. 4 is a cross-sectional view of the guide frame and cap withdrawing tool taken along line IV—IV of FIG. 2.
Figure 5:
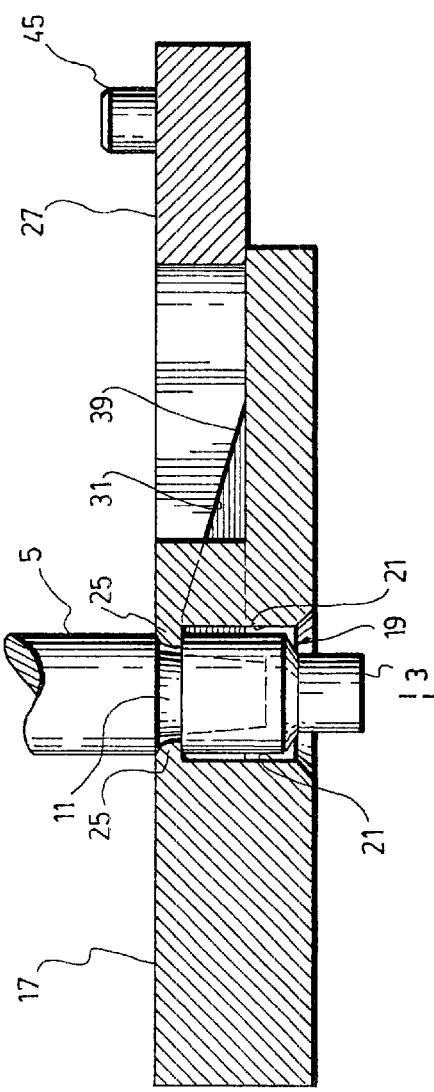
FIG. 5 is a cross-sectional view similar to FIG. 4 with the tip of the welding electrode being inserted in a recessed portion of the guide frame in an engaged position.

Referring back to FIG. 2, the apparatus includes a guide frame 17 having a recessed portion 19 sized for receiving the tip 7 of the welding electrode. The recessed portion 19 extends in a direction perpendicular to the tip 7 of the welding electrode and has two facing side walls 21 and an end wall 23. The side walls 21 have guiding ribs 25 (see FIGS. 4 and 5) that are inserted in the peripheral hollow joint 11 for guiding the tip 7 of the welding electrode into the recessed portion 19, along the direction depicted by arrow A, until the tip 7 of the welding electrode is abutted against the end wall 23 in an engaged position.

Figure 6:
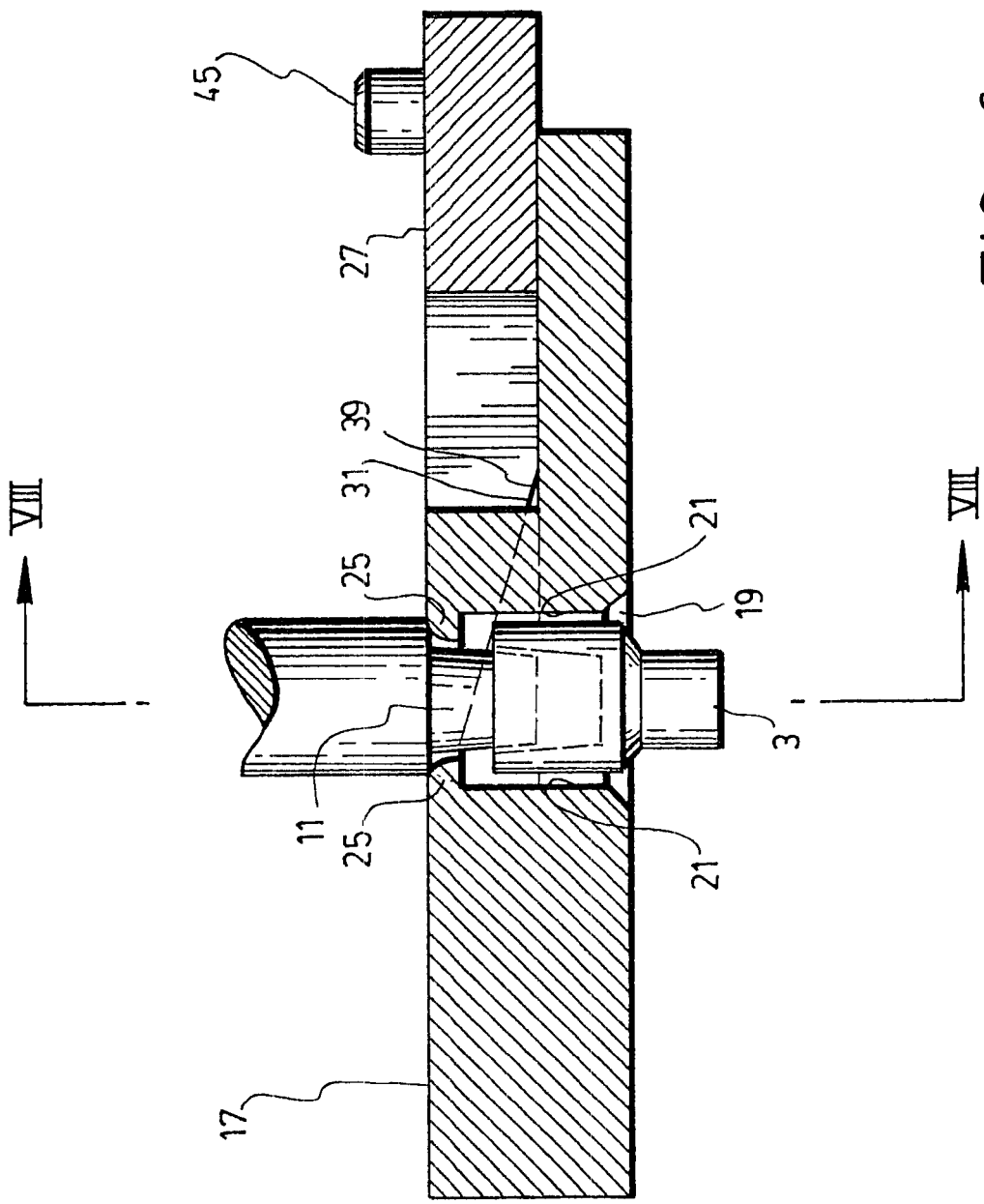
FIG. 6 is cross-sectional view similar to FIG. 4 with the cap of the welding electrode being partially removed from its shank by means of wedges provided on the cap withdrawing tool.
Figure 7:
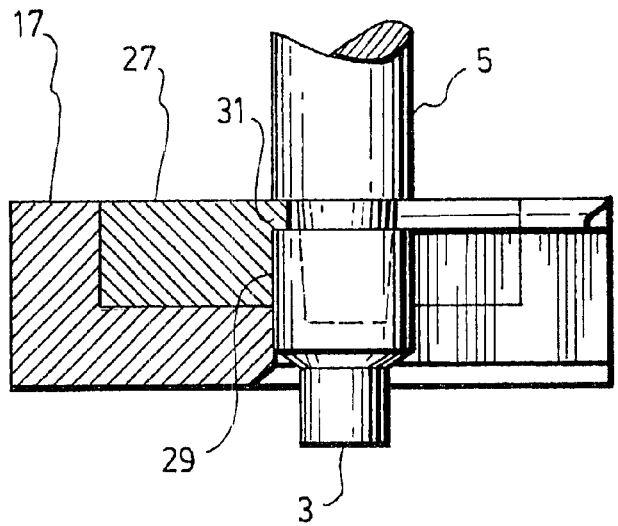
FIG. 7 is a cross-sectional view taken along line VII—VII of FIG. 5 showing the tip of the welding electrode being inserted in the recessed portion of guide frame.

The apparatus also includes a cap withdrawing tool 27 movably mounted on the guide frame 17. The cap withdrawing tool 27 is movable along a crosswise direction, as depicted by arrow B (see FIG. 3), that is perpendicular with respect to both the tip 7 and the recessed portion 19 when the tip 7 of the welding electrode is in the engaged position, as shown for example in FIGS. 5 and 7. The tool 27 has two facing wall sections 29 each having a wedge 31 that is inserted in the peripheral hollow joint 11 when the tool 27 is moved toward the tip 7 of the electrode that is in the engaged position. When the tool 27 is moved toward the tip 7 of the electrode, as shown for example in FIGS. 6 and 8, the wedge 31 is forced against the back surface 15 of the cap 3 and thereby removes the cap 3 from the shank 5, as shown for example in FIGS. 3 and 9.

Figure 10:
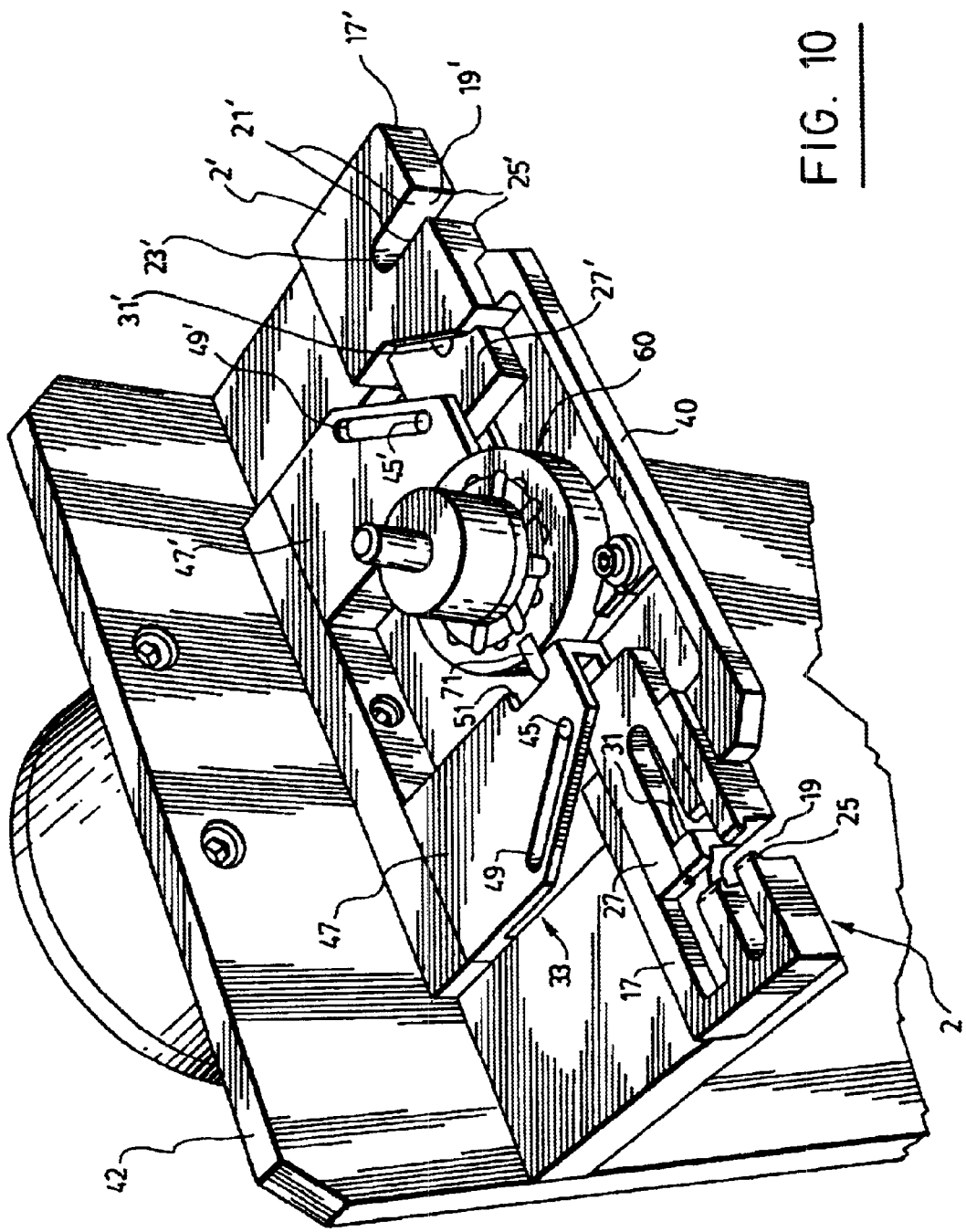
FIGS. 10 and 11 are perspective views similar to FIGS. 1 and 2 showing more details of the apparatus for separating a cap from a shank of a tip of a welding electrode with a cap supply drum being removed.
Figure 11:
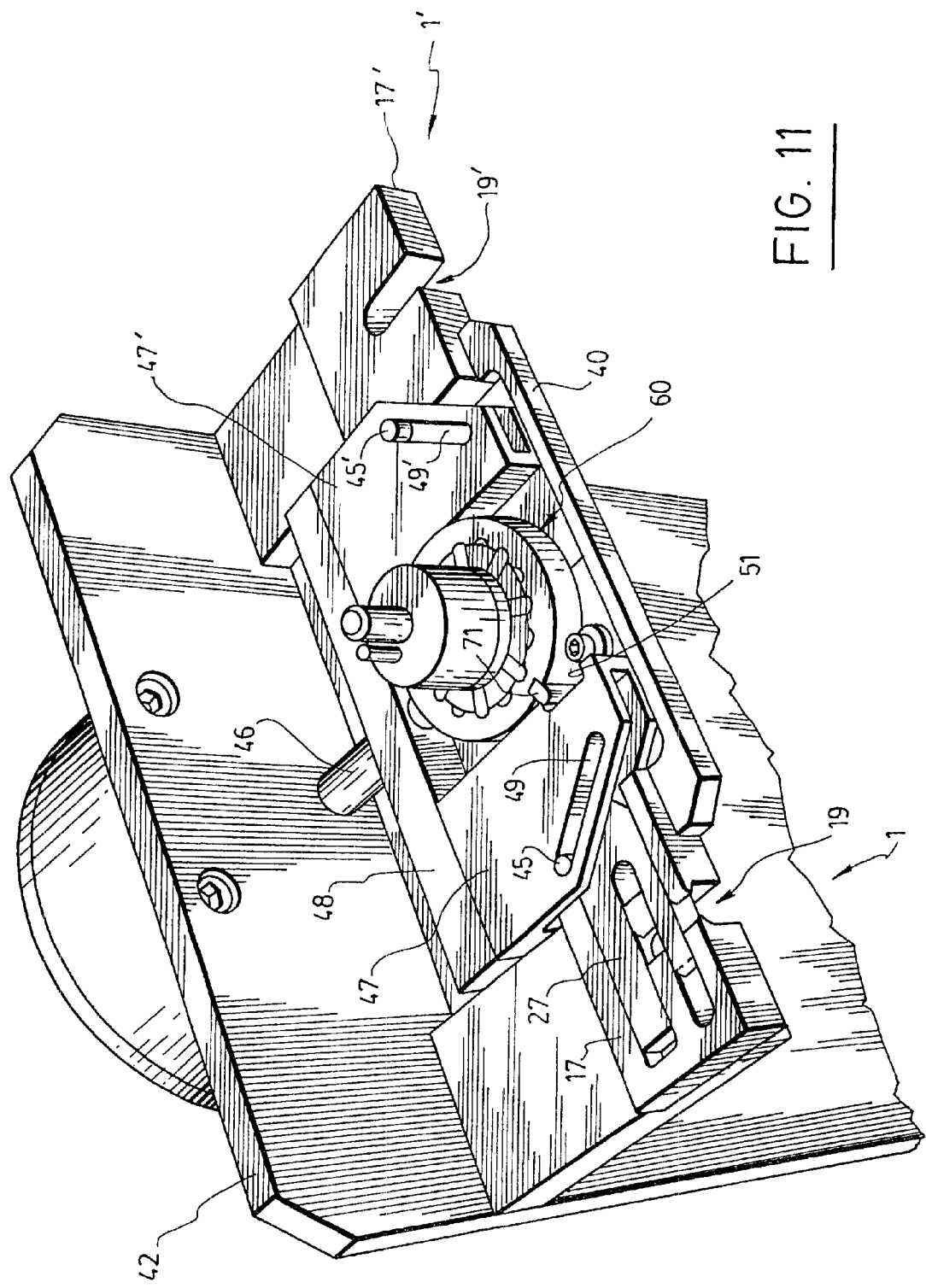
Figure 12:
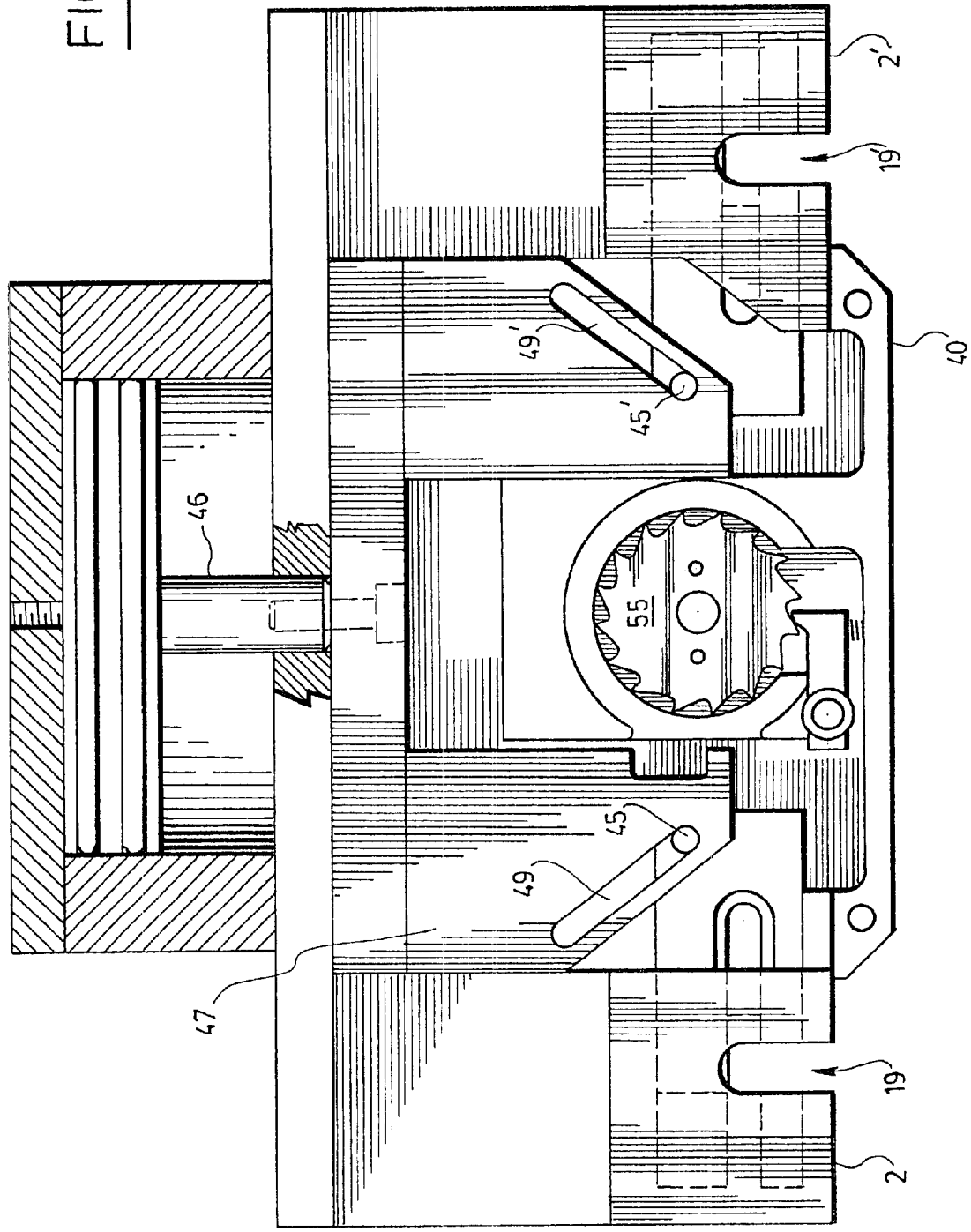
FIG. 12 is a top partly cross-sectional view of FIG. 10 with connectors of the cap supply drum being removed.

Referring to FIGS. 10 and 11, the apparatus also includes a driving mechanism 33 coupled to the cap withdrawing tool 27 for moving the cap withdrawing tool 27 toward and away from the tip 7 of the welding electrode along the crosswise direction between an open position, as shown for example in FIG. 10, where the tip 7 of the electrode is inserted into and removed from the recessed portion 19 of the guide frame 17 and a closed position, as shown for example in FIG. 11, where the wedge 31 removes the cap 3 from the shank 5. Of course, those skilled in the art will understand that many driving mechanisms may be used for moving the cap withdrawing tool 27 back and forth between in its open and closed positions. A hydraulic or pneumatic piston connected to the cap withdrawing tool may be used for example. However, as it will be further described below, the driving mechanism 33 may also serve another purpose of indexing a rotatable cap supply drum 53 (see FIG. 1) that is positioned adjacent to the guide frame 17 and cap withdrawing tool 27.

Figure 8:
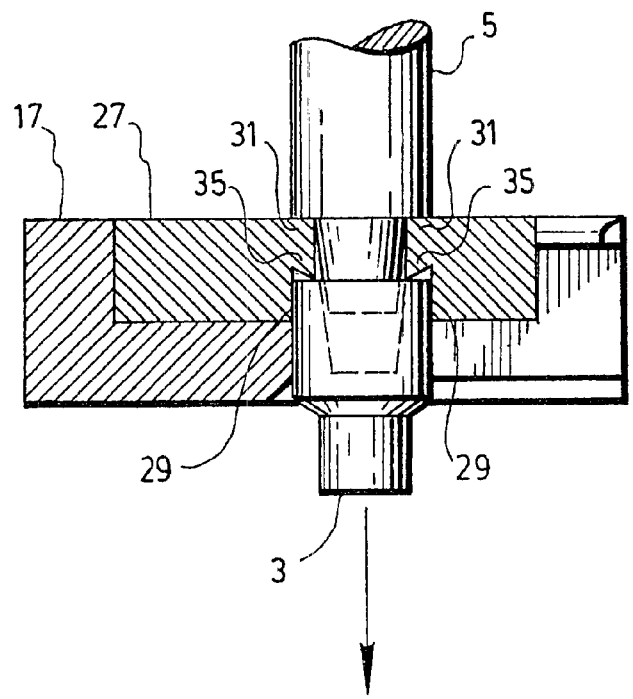
FIG. 8 is a cross-sectional view taken along line VIII—VIII of FIG. 6 showing the cap of the welding electrode being partially removed from its shank by means of wedges provided on the cap withdrawing tool.
Figure 9:
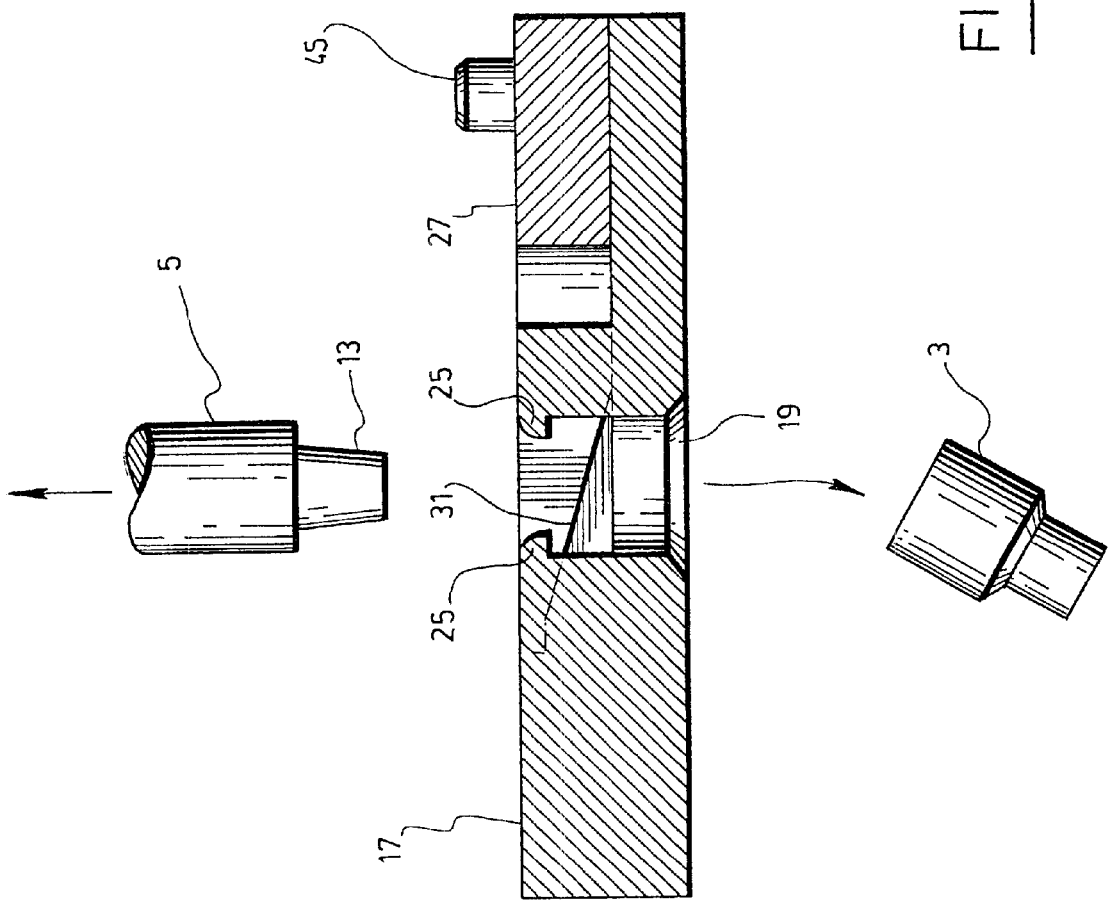
FIG. 9 is a cross-sectional view taken along line IX—IX of FIG. 3 showing the cap being withdrawn from its shank by means of wedges of the cap withdrawing tool.

Referring to FIG. 8, it is preferable that each wedge 31 be provided with a knife edge 35 that is forced into the back surface 15 of the cap 3 for removing the cap 3 from the shank 5 when the cap withdrawing tool 27 is moved toward the tip 7 of the electrode that is in the engaged position. It is to be noted that if the back surface 15 of the cap 3 is very thin, as is the case for most caps used in the industry, then a cap withdrawing tool that is not provided with a knife edge may not perform satisfactorily to remove the cap. Furthermore, because electrode caps are generally made of copper, which is a soft conducting metal, the problem may be worsened, because using a wedge 31 without a knife edge 35 might crush the thin and soft back surface 15 of the electrode cap 3. This is one of the reasons why knife edges 35 are preferably provided for on the wedges 31. If a knife edge 35 is provided on the wedge 31, it is preferable that it form an angle of about 2 degrees with respect to the back surface 15 of the cap 3 when the tip 7 of the electrode 9 is in the engaged position.

Referring to FIGS. 2 to 6, the wedge 31 preferably has a flat section 37 followed by an angled section 39, which forms an angle of about 17 degrees with respect to the flat section 37. With such a configuration, the wedge 31 is progressively forced against the back surface 15 of the cap 3, without damaging the shoulder of the shank 5. Of course, other suitable angles and configurations may be selected to achieve the same results as it will be understood by those skilled in the art.

Preferably, the guide frame 17 has two parallel grooved channels 43, 43' extending along the crosswise direction and a grooved portion 44 that support the cap withdrawing tool 27. The grooved channels 43, 43' are perpendicular to and intersect the recessed portion 19. Furthermore, the cap withdrawing tool 27 has a complementary shape fitting into the grooved channels 43, 43' for movement thereof along the crosswise direction. Each of the grooved channels 43, 43' has a bottom face 26, 26' that extends all the way to the grooved portion 44. The facing walls 28, 28' of the grooved channels 43, 43' guide the cap withdrawing tool 27 along the crosswise direction as it is moved across the guide frame 17 along the crosswise direction. One of the grooved channels 43 extends across and beyond both side walls 21 of the recessed portion 19 at about a mid portion thereof. The other grooved channel 43' extends tangentially with respect to the end wall 23 of the recessed portion 19. The grooved portion 44 is adjacent to and communicates with the parallel grooved channels 43, 43'. Both grooved channels 43, 43' communicate with each other through a channel 30 extending above and parallel to the recessed portion 19. The channel 30 is sized so as to allow the tip 7 of the electrode to fit therein as it is abutted against the end wall 23. The channel 30 separates two middle portions 32 of the guide frame 17, which are further defined by the grooved channels 43, 43'.

The cap withdrawing tool 27 preferably has a U-shape that defines a recessed section 41 also sized for engaging with the tip 7 of the electrode. The recessed section 41 of the U-shaped cap withdrawing tool 27 is the one that is preferably provided with the facing wall sections 29 and wedges 31.

The driving mechanism 33 is preferably coupled to a proximity sensor 4 directed toward the recessed portion 19 of the guide frame 17 for detecting that the tip 7 of the welding electrode is in the engaged position and sending a signal to the driving mechanism 33 for moving the tool 27 toward the tip 7 of the electrode. It is to be understood that the proximity sensor may be located in a position that is different from the one illustrated. Furthermore, other means may used to determine that the tip 7 of the electrode is in the engaged position, such as for example a position sensor provided on the robot welder that sends the appropriate signals to the driving mechanism for moving the cap withdrawing tool 27 in a suitable manner.

The following portion of the description is now concerned with another aspect of the invention, namely the replacement of the cap 3 with a new cap 54 that is provided on a rotatable cap supply drum 53.

Referring to FIGS. 1, 10 and 11, the guide frame 17 and the cap withdrawing tool 27 both define a first cap withdrawing set 2 that is mounted on a first end of a support plate 40. A second end of the support plate 40 further supports a second cap withdrawing set 2' which is substantially identical to the first cap withdrawing set 2. Both sets 2, 2' face in the same direction toward the robot welder holding the tips 7, 7'. The difference is that the second set 2' is positioned upside down with respect to the first set 2. Both sets are connected to proximity sensors 4, 4'. As will be described further below, the driving mechanism 33 is coupled to both cap withdrawing tools 27 of each set 2, 2'. The reason the second set 2' is in an upside down position is to avoid having to turn the arm 10 of the robot welder upside down when replacing the caps 3, 3'. This feature saves times and therefore improves the efficiency of the apparatus.

The support plate 40 is preferably positioned horizontally and is fixed to a vertical support plate 42. Furthermore, it is preferably to use a xyz compliance positioning system (not shown) connected to the support plate 40 for adjusting and correcting the position of all the elements mounted on the support plate 40 with respect to the robotic welder.

Preferably, each of the cap withdrawing tools 27 has a pin 45 projecting therefrom for cooperating with the driving mechanism 33. The driving mechanism 33 includes a push rod 46 connected to two drive plates 47, 47' by means of a transverse bar 48. Each drive plate 47, 47' has an angled slot 49, 49' slidably receiving the pin 45 of a corresponding cap withdrawing tool 27 for moving the cap withdrawing tools toward and away from the tip 7 of the welding electrode which is in the engaged position in one of the recessed portions 19 or 19'. One of the drive plates 47 has a side slot 51 for indexing a rotatable cap supply drum 53. The push rod 46 is actuated by any suitable means such as a pneumatic motor for example that moves the rod 46 back and forth. Of course, those skilled in the art will understand that this movement must be coordinated with that of the robot welder which is in turn precisely controlled by a program.

Figure 13:
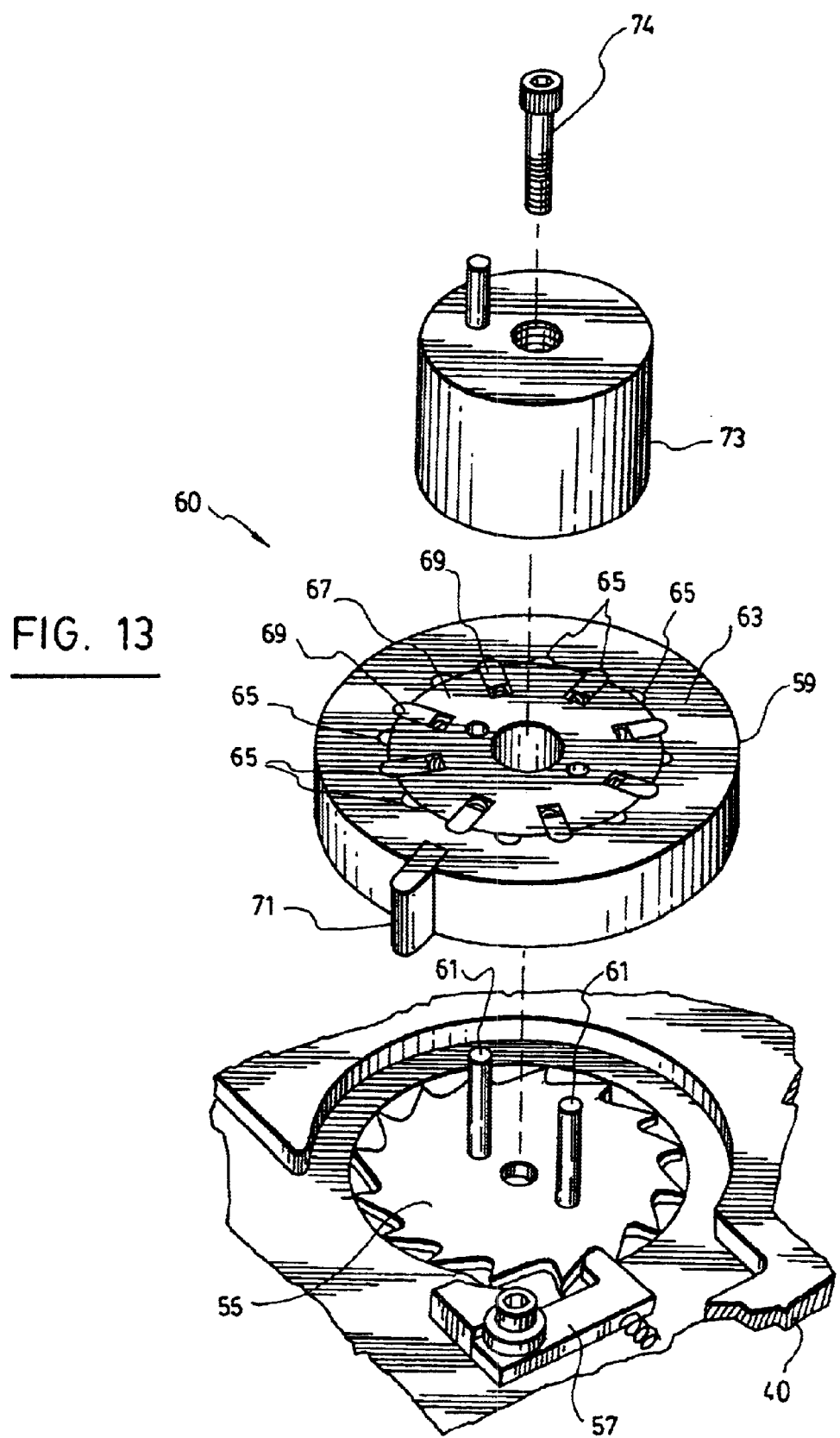
FIG. 13 is a partial perspective and exploded view of indexing elements of the cap supply drum.
Figure 14:
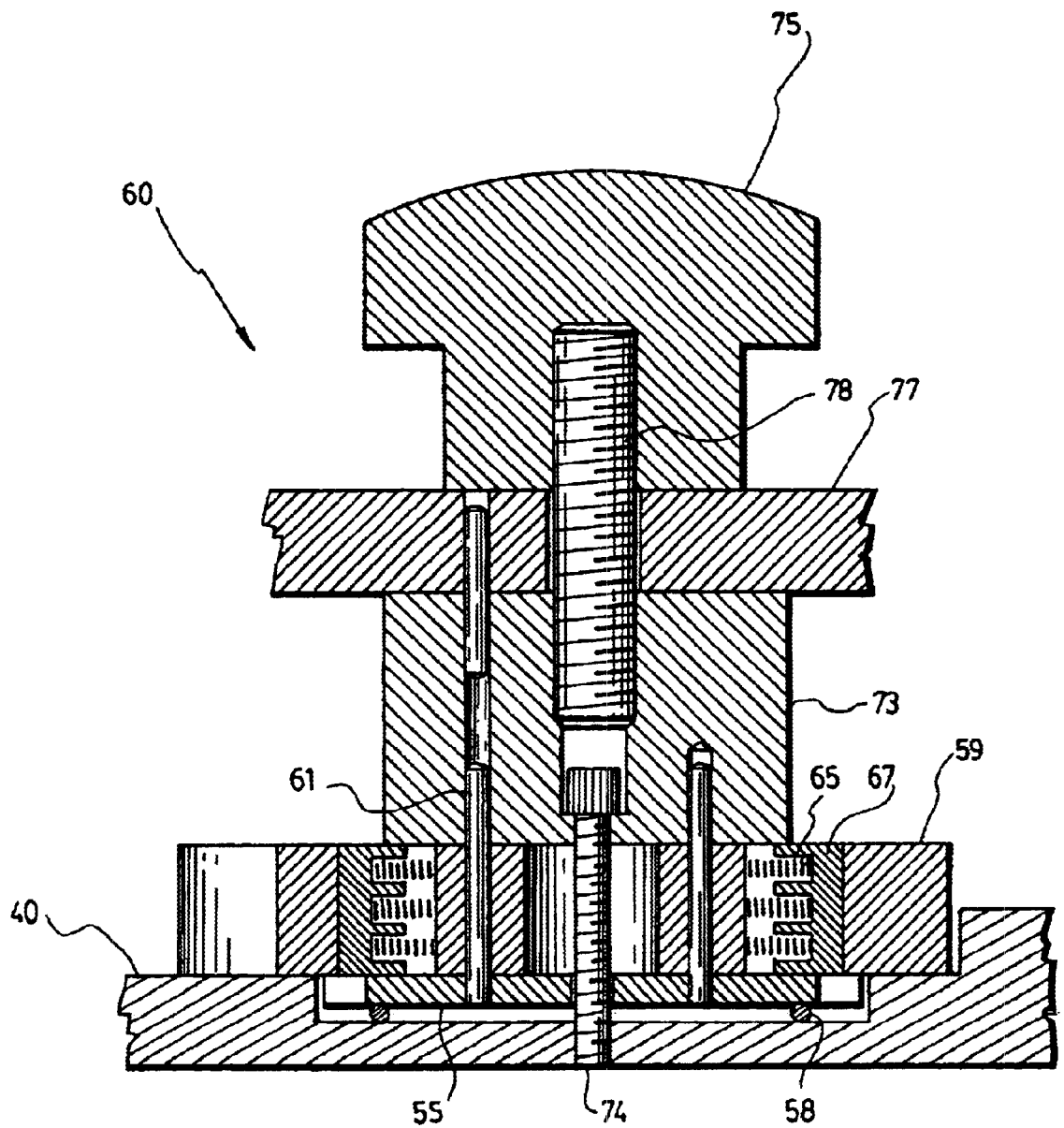
FIG. 14 is a cross-sectional view taken along line XIV—XIV of FIG. 1 showing more details of the indexing components of the cap supply drum.
Figure 15:
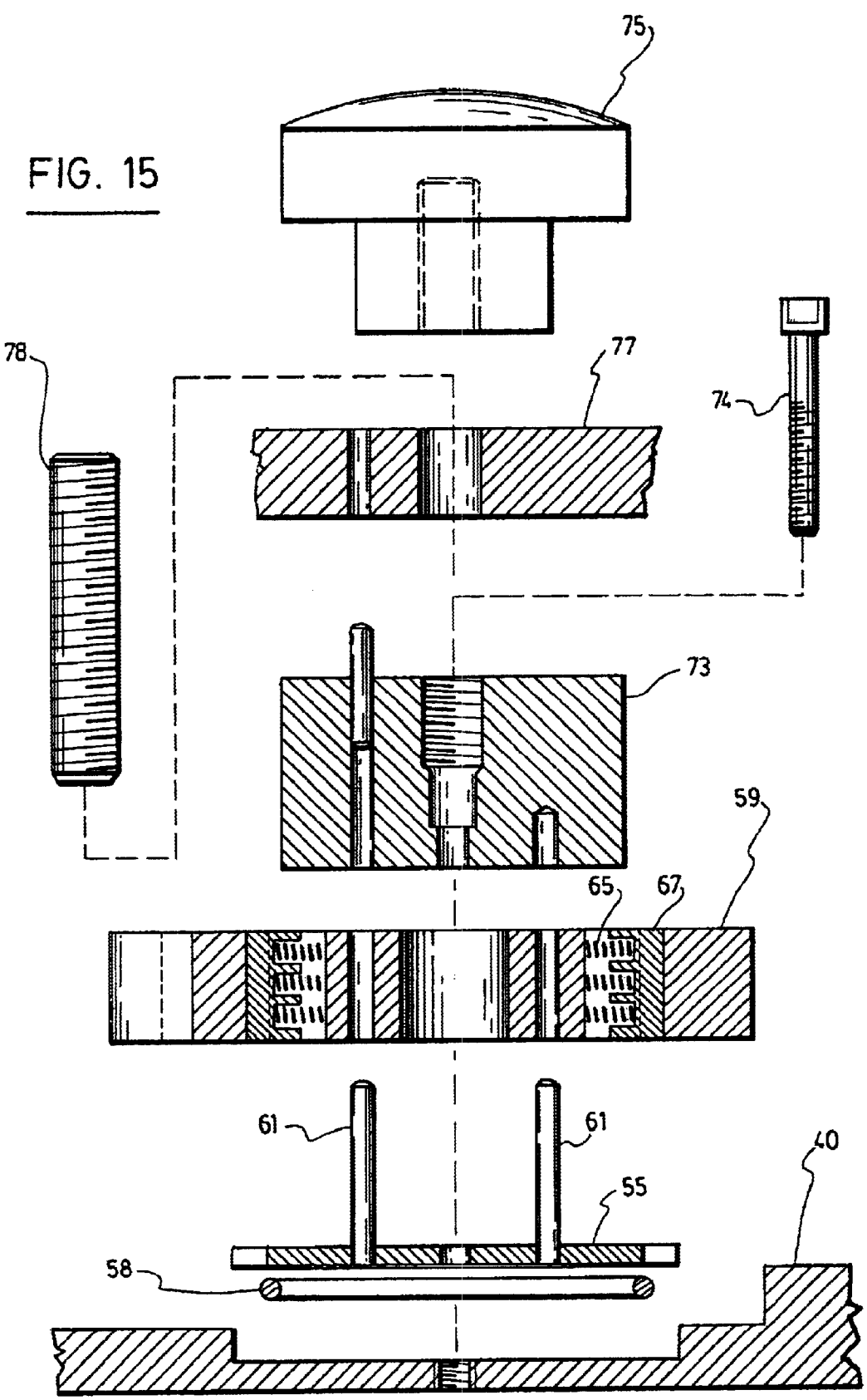
FIG. 15 is an exploded view of the indexing components of the cap supply drum shown in FIG. 14.

The cap supply drum 53 is mounted on the support plate 40 and can only turn in one direction, which in this example is anti-clockwise, so that a new cap 54 to be withdrawn is always present at a home position thereof. The following descriptive portion will explain the details of the indexing mechanism 60 of the support plate 53 (also see FIGS. 13–15). To achieve this result a sprocket wheel 55 is provided with teeth directed in the opposite turning direction. The sprocket wheel is mounted on spacers 58 mounted on the support frame 40. A spring loaded tab 57 engages each of the teeth a time so that the sprocket wheel 55 is blocked from going in an opposite direction. An indexing disk 59 is mounted on the sprocket wheel 55 by means of two pins 61. The indexing disk 59 is made of an outer ring 63 provided with inner cavities 65 disposed all around the ring 63. The distance between the cavities 65 determines the distance by which the cap supply drum 53 is rotated. The indexing disk 59 also has an inner ring 67 positioned within the outer ring 63. The inner ring 67 is provided with spring loaded locking members 69 cooperating with the cavities 65 of the outer ring 63. The outer ring 63 is provided with an indexing tab 71 that is pushed back and forth by the side slot 51 of one of the drive plates 47. Onto the indexing disk 59 is mounted a spacer 73 that is placed under the disk 77. A screw 74 is used to secure the spacer 73 and the indexing disk 59. Another screw 78 is used to secure the spacer 73, the disk 77 and the cap 75 of the cap supply drum 53. The cap supply drum 53 includes a rotatable disk 77 having cap holders 56 extending next to one another around the disk 77 in alternating upside and downside positions. Each cap holder 56 holds a new cap 54 which is positioned in an opposite direction with respect to an adjacent new cap 54'. The cap holders 56 are resiliently biased by means of springs 79.

Figure 3:
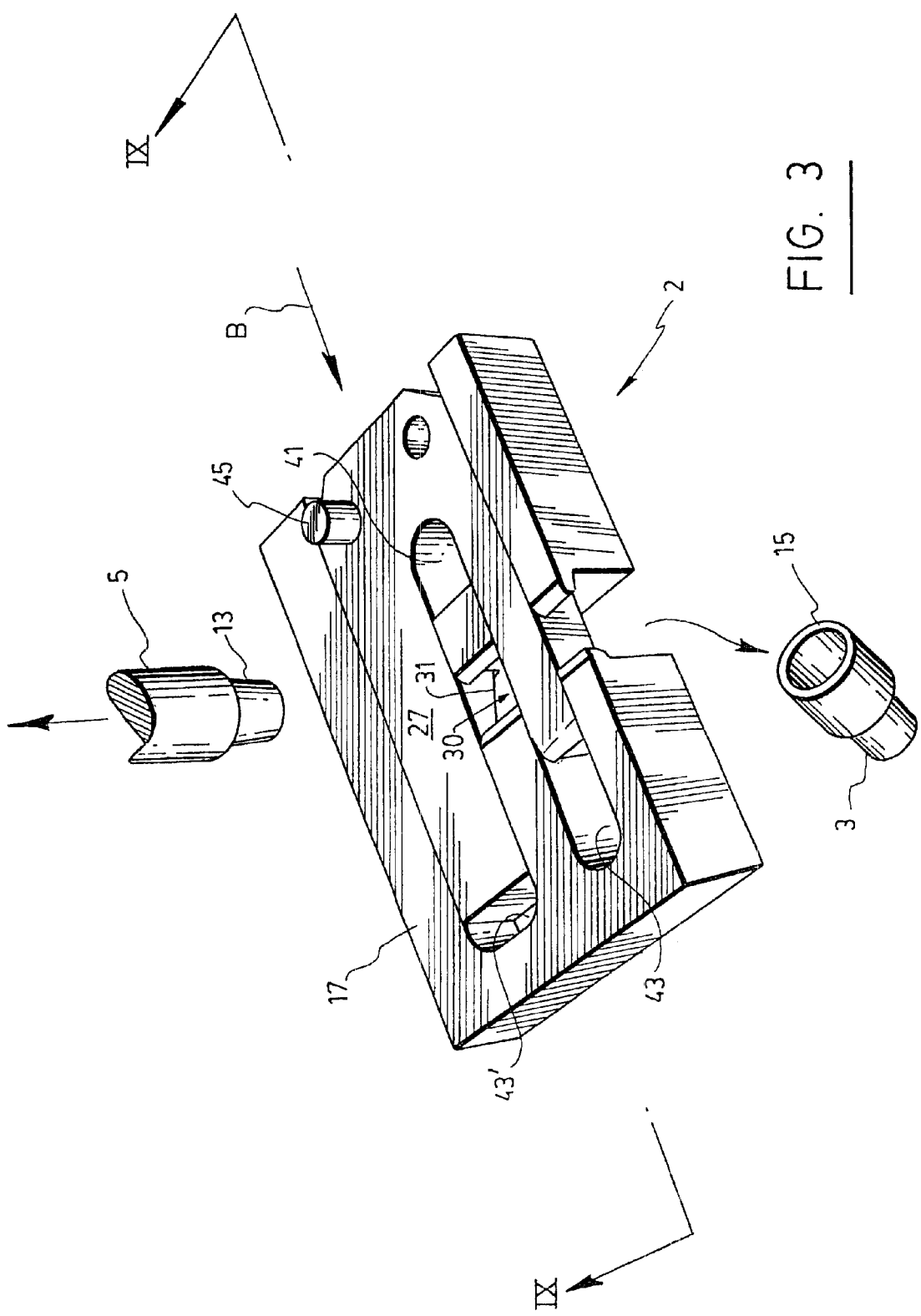
FIG. 3 is a partial perspective view of a cap being withdrawn from its shank by means of the cap withdrawing tool that is in its closed position, according to a preferred embodiment of the present invention.
Figure 16:
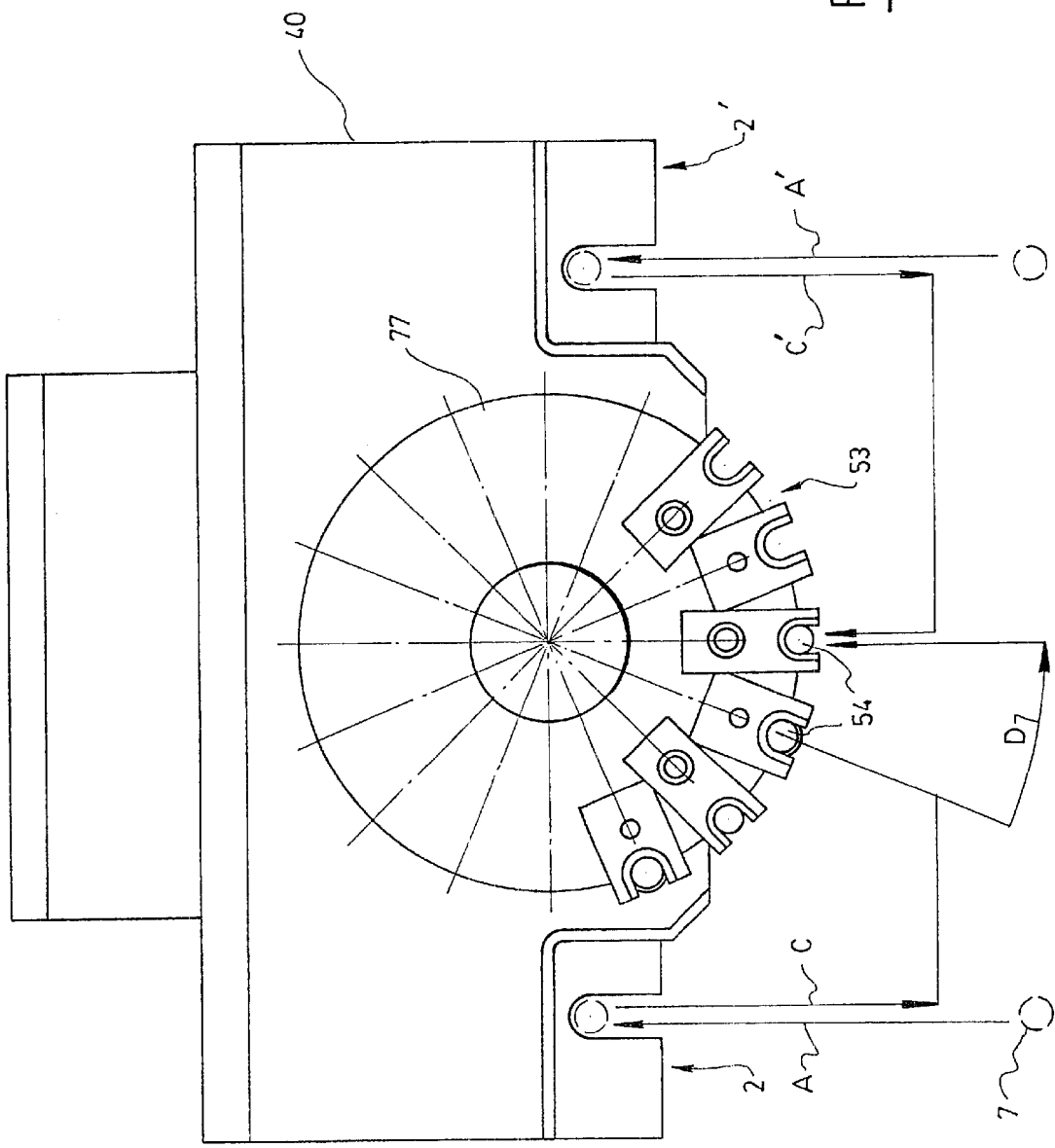
FIG. 16 is a top schematic view similar to FIG. 1 showing operational steps for removing and replacing the caps of a welding electrode.
Figure 18:
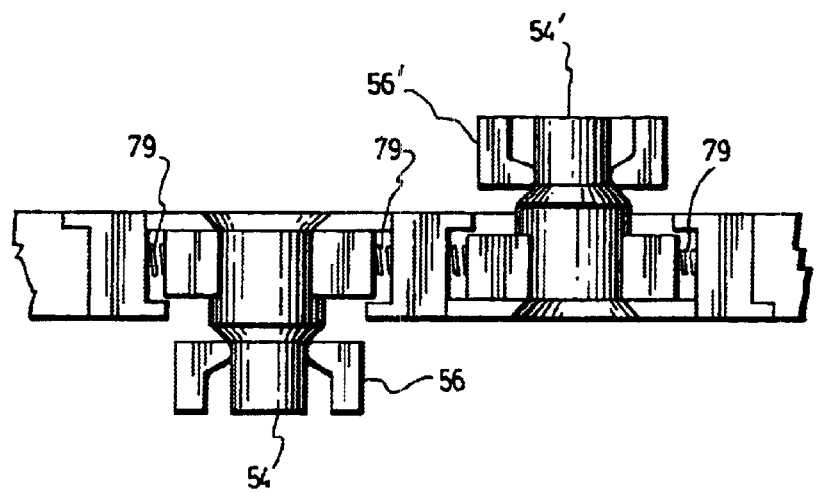
FIGS. 17 and 18 are respectively partial top and side views of the cap supply drum shown in FIG. 1 holding new replacement caps.
Figure 17:
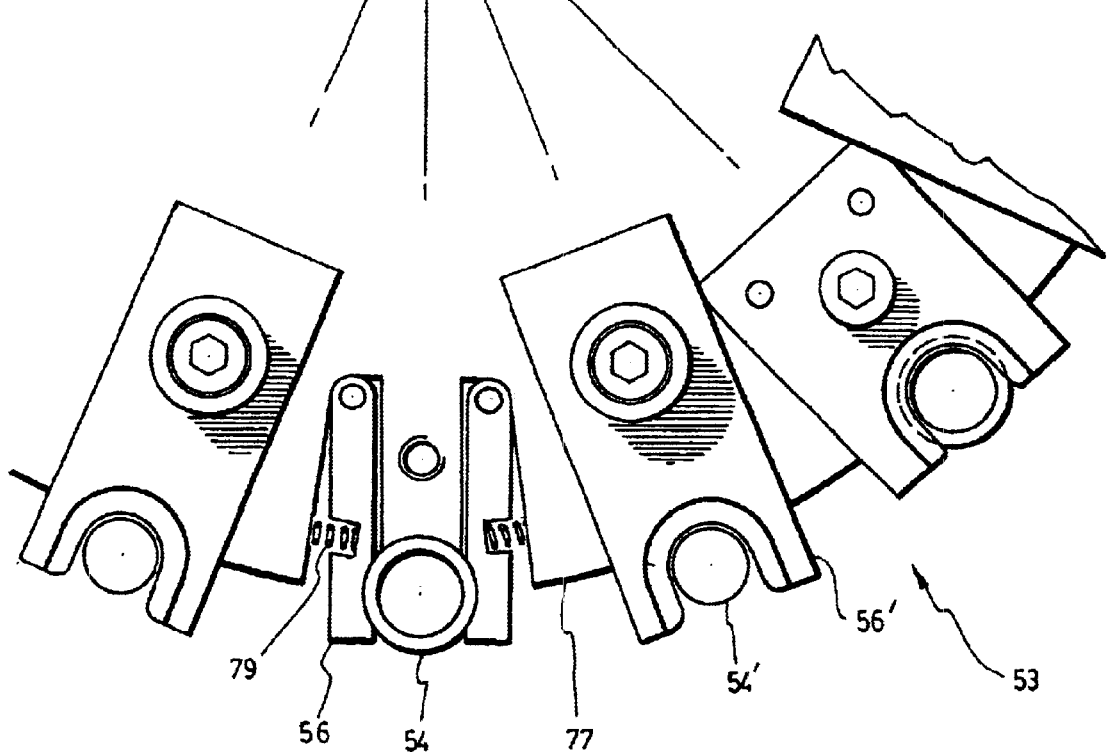

The following portion of the description will now describe a method of separating and replacing first and second caps 3, 3' from first and second shanks 5, 5' of first and second tips 7, 7' of welding electrodes. As mentioned above the tips 7, 7' face each other in a closable clamp arrangement and are held by opposite fingers 9, 9' pivotally mounted on an arm 10 of a welding robot. Similarly as explained above the caps and the shanks form first and second peripheral hollow joints 11, 11' that are defined by recessed end surfaces 13, 13' of the shanks 5, 5' and back surfaces 15, 15' of the caps 3, 3'. The method according to a preferred embodiment of the present invention comprises the steps of:

a) inserting the first tip 7 of the first welding electrode, as depicted by arrow A of FIG. 16, by means of the robot welder, in a first recessed portion 19 of a first guide frame 17, the first recessed portion extending in a direction perpendicular to the first tip 7 and having two first facing side walls 21 provided with first guiding ribs 25 and a first end wall 23;

b) guiding the first tip 7 of the first electrode by means of the first guiding ribs 25 of the first side walls 21 that are inserted in the first peripheral hollow joint 11 until the first tip 7 of the welding electrode is abutted against the first end wall 23 in a first engaged position;

c) detecting that the first tip 7 of the first welding electrode is in the engaged position;

d) moving a first cap withdrawing tool 27 in a closed position, the first tool 27 being mounted on the first guide frame 17 along a first crosswise direction, as depicted by arrow B of FIG. 3, that is perpendicular with respect to both the first tip 7 and the first recessed portion 19, the first tool 27 having two facing wall sections 29 each having a wedge 31 being inserted in the first peripheral hollow joint 11 and forced against the back surface 15 of the first cap 3, thereby removing the first cap 3 from the first shank 5;

e) moving the first cap withdrawing tool 27 in an open position, as shown for example in FIG. 10, along the crosswise direction and simultaneously actuating an indexing mechanism 60 that moves a first new cap 54 mounted on a first holder 56 of a cap supply drum 53 in a home position, as depicted for example by arrow D of FIG. 16;

f) positioning the first and second tips 7, 7' by means of the robot welder in the home position where the first tip 7 is in alignment with the first new cap 54, as depicted for example by arrow C of FIG. 16;

g) closing the first tip 7 against the second tip 7' to insert the first new cap 54 into the first shank 5 of the first tip 7;

h) inserting the second tip 7' of the second welding electrode, as depicted by arrow A' of FIG. 16, by means of the robot welder, in a second recessed, portion 19' of a second guide frame 17', the second recessed portion 19' extending in a direction perpendicular to the second tip 7' and having two second facing side walls 21' provided with second guiding ribs 25' and a second end wall 23', the second guide frame 17' being upside down with respect to the first guide frame 17;

i) guiding the second tip 7' of the electrode by means of the second guiding ribs 25' of the second side walls 21' that are inserted in the second peripheral hollow joint 11' until the second tip 7' of the welding electrode is abutted against the second end wall 23' in a second engaged position;

j) detecting that the second tip 7' of the welding electrode is in the engaged position;

k) moving a second cap withdrawing tool 27' in a closed position, the second tool 27' being mounted on the second guide frame 17' along a second crosswise direction that is perpendicular with respect to both the second tip 7' and the second recessed portion 19', the second tool 27' having two facing wall sections 28' each having a wedge 31' being inserted in the second peripheral hollow joint 11' and forced against the back surface 15' of the second cap 3', thereby removing the second cap 3' from the second shank 5';

l) moving the second cap withdrawing tool 27' in an open position along the crosswise direction and simultaneously actuating the indexing mechanism 60 that moves a second new cap 54' mounted on a second holder 56' of the cap supply drum 53 in the home position, as depicted for example by arrow D of FIG. 16;

m) positioning the first and second tips 7, 7' by means of the robot welder in the home position where the second tip 7' is in alignment with the second new cap 54', as depicted for example by arrow C' of FIG. 16; and n) closing the second tip 7' against the first tip 7 to insert the second new cap 54' into the second shank 5' of the second tip 7'.

The apparatus and method for separating a cap from a welding electrode and replacing the cap with a new cap according to the present invention are simpler and more efficient than those provided in prior art. Indeed, only a single actuator is needed to simultaneously perform both functions of removing a cap from its electrode and automatically indexing of a cap supply drum. The apparatus and method are thus easily integrated in industrial plants, such as in automobile factories, which tend to be more and more completely automated.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. Apparatus for separating a cap from a shank of a tip of a welding electrode, said cap and said shank forming a peripheral hollow joint that is defined by a recessed end surface of the shank and a back surface of the cap, the apparatus comprising:

a guide frame having a recessed portion sized for receiving the tip of the welding electrode, said recessed portion extending in a direction perpendicular to said tip and having two facing side walls and an end wall, the side walls having guiding ribs that are inserted in the peripheral hollow joint for guiding the tip of the welding electrode into the recessed portion until the tip of the welding electrode is abutted against the end wall in an engaged position;

a cap withdrawing tool movably mounted on the guide frame, said cap withdrawing tool being movable along a crosswise direction that is perpendicular with respect to both the tip and the recessed portion when the tip of the welding electrode is in the engaged position, said tool having two facing wall sections each having a wedge that is inserted in the peripheral hollow joint when the tool is moved toward the tip of the electrode that is in the engaged position, said wedge being forced against the back surface of the cap for removing the cap from the shank when the tool is moved toward the tip of the electrode; and a driving mechanism coupled to the cap withdrawing tool for moving the cap withdrawing tool toward and away from the tip of the welding electrode along the crosswise direction between an open position where the tip of the electrode is inserted into and removed from the recessed portion of the guide frame and a closed position where the wedge removes the cap from the shank.

2. The apparatus according to claim 1, wherein each wedge of the facing wall sections of the cap withdrawing tool has a knife edge that is forced into the back surface of the cap for removing the cap from the shank when the tool is moved toward the tip of the electrode that is in the engaged position.

3. The apparatus according to claim 2, wherein the knife edge forms an angle of about 2 degrees with respect to the back surface of the cap when the tip of the electrode is in the engaged position.

4. The apparatus according to claim 1, wherein the wedge has a flat section and an angled section forming an angle of about 17 degrees with respect to the flat section.

5. The apparatus according to claim 2, wherein the guide frame has two parallel grooved channels extending along the crosswise direction and a grooved portion supporting the cap withdrawing tool, the grooved channels being perpendicular to and intersecting with the recessed portion, and wherein the cap withdrawing tool has a complementary shape fitting into said parallel grooved channels for movement thereof along said crosswise direction.

6. The apparatus according to claim 5, wherein the complementary shape of the cap withdrawing tool has a U-shape comprising a recessed section sized for engaging with the tip of the electrode when in the engaged position.

7. The apparatus according to claim 2, wherein the driving mechanism is coupled to a proximity sensor directed toward the recessed portion of the guide frame for detecting that the tip of the welding electrode is in the engaged position and sending a signal to the driving mechanism for moving the tool toward the tip of the electrode.

8. The apparatus according to claim 2, wherein the apparatus is further for separating a second cap of a tip of an electrode facing said other tip in a closable clamp arrangement, said tips being held by opposite fingers pivotally mounted on an arm of a welding robot, and wherein the guide frame and the cap withdrawing tool both define a first cap withdrawing set mounted on a first end of a support plate, a second end of the support plate further supporting a second cap withdrawing set substantially identical to said first cap withdrawing set, both sets having their recessed portions facing in a same direction and said second set being positioned upside down with respect to the first set, said driving mechanism being coupled to the cap withdrawing tools of each set.

9. The apparatus according to claim 8, wherein each of the cap withdrawing tools of each set has a pin projecting therefrom, and the driving mechanism comprises a push rod that is connected to a pair of drive plates, each drive plate having an angled slot slidably receiving the pin of a corresponding cap withdrawing tool for moving both cap withdrawing tools of each set toward and away from one of said tips being in the engaged position, one of said drive plates having a side slot for indexing a cap supply drum.

10. The apparatus according to claim 9, wherein the cap supply drum comprises a unidirectional indexing mechanism having an indexing tab engaging with the side slot of said one of the drive plates for rotating the cap supply drum by a step movement when moving the push rod in one direction.

11. The apparatus according to claim 10, wherein the cap supply drum comprises a rotatable disk having cap holders extending next to one another around said disk in alternating upside and downside positions, each holder holding a new cap which is positioned in an opposite direction with respect to an adjacent new cap.

12. Method of separating and replacing first and second caps from first and second shanks of first and second tips of welding electrodes, said tips facing each other in a closable clamp arrangement and being held by opposite fingers pivotally mounted on an arm of a welding robot, said caps and said shanks forming first and second peripheral hollow joints that are defined by recessed end surfaces of the shanks and back surfaces of the caps, the method comprising the steps of:

a) inserting the first tip of the first welding electrode, by means of the robot welder, in a first recessed portion of a first guide frame, said first recessed portion extending in a direction perpendicular to said first tip and having two first facing side walls provided with first guiding ribs and a first end wall;

b) guiding the first tip of the first electrode by means of the first guiding ribs of the first side walls that are inserted in the first peripheral hollow joint until the first tip of the first welding electrode is abutted against the first end wall in a first engaged position;

c) detecting that the first tip of the first welding electrode is in the engaged position;

d) moving a first cap withdrawing tool in a closed position, said first tool being mounted on the first guide frame along a first crosswise direction that is perpendicular with respect to both the first tip and the first recessed portion, said first tool having two facing wall sections each having a wedge being inserted in the first peripheral hollow joint and forced against the back surface of the first cap, thereby removing the first cap from the first shank;

e) moving said first cap withdrawing tool in an open position along the crosswise direction and simultaneously actuating an indexing mechanism that moves a first new cap mounted on a first holder of a cap supply drum in a home position;

f) positioning the first and second tips by means of the robot welder in the home position where the first tip is in alignment with the first new cap;

g) closing the first tip against the second tip to insert the first new cap into the first shank of the first tip;

h) inserting the second tip of the second welding electrode, by means of the robot welder, in a second recessed portion of a second guide frame, said second recessed portion extending in a direction perpendicular to said second tip and having two second facing side walls provided with second guiding ribs and a second end wall, said second guide frame being upside down with respect to the first guide frame;

i) guiding the second tip of the electrode by means of the second guiding ribs of the second side walls that are inserted in the second peripheral hollow joint until the second tip of the welding electrode is abutted against the second end wall in a second engaged position;

j) detecting that the second tip of the welding electrode is in the engaged position;

k) moving a second cap withdrawing tool in a closed position, said second tool being mounted on the second guide frame along a second crosswise direction that is perpendicular with respect to both the second tip and the second recessed portion, said second tool having two facing wall sections each having a wedge being inserted in the second peripheral hollow joint and forced against the back surface of the second cap, thereby removing the second cap from the second shank;

l) moving said second cap withdrawing tool in an open position along the crosswise direction and simultaneously actuating the indexing mechanism that moves a second new cap mounted on a second holder of the cap supply drum in the home position;

m) positioning the first and second tips by means of the robot welder in the home position where the second tip is in alignment with the second new cap; and n) closing the second tip against the first tip to insert the second new cap into the second shank of the second tip.

13. The method according to claim 12, wherein each wedge of the wall sections of the first and second tools are provided with a knife edge.

14. The method according to claim 13, wherein each said knife edge forms an angle of about 2 degrees with respect to one of said first and second tips that is in the engaged position.

15. The method according to claim 12, wherein each wedge has a flat section and an angled section forming an angle of about 17 degrees with respect to the flat section.

16. The method according to claim 13, wherein each of said guide frames has two parallel grooved channels extending along each of said crosswise directions and a grooved portion supporting each of said cap withdrawing tools, the grooved channels being perpendicular to and intersecting with each of said recessed portions, and wherein each of said cap withdrawing tools has a complementary shape fitting into the parallel grooved channels for movement thereof along each of said crosswise directions.

17. The method according to claim 16, wherein the complementary shape of each of said cap withdrawing tools has a U-shape comprising a recessed section sized for engaging with each of said tips when in the engaged position.

18. The method according to claim 12, wherein steps c) and j) are carried out by means of first and second proximity sensors directed toward each of said recessed portions of the guide frames for detecting that each said tip is in the engaged position.

19. The method according to claim 12, wherein the cap supply drum comprises a rotatable disk having cap holders extending next to one another around said disk in alternating upside and downside positions, said cap holders holding new caps to be inserted in said first and second tips.

20. Apparatus for separating a cap from a shank of a tip of a welding electrode, said cap and said shank forming a peripheral hollow joint that is defined by a recessed end surface of the shank and a back surface of the cap, the apparatus comprising:

a guide frame having a recessed portion sized for receiving the tip of the welding electrode, said recessed portion extending in a direction perpendicular to said tip and having two facing side walls and an end wall, the side walls having guiding ribs that are inserted in the peripheral hollow joint for guiding the tip of the welding electrode into the recessed portion until the tip of the welding electrode is abutted against the end wall in an engaged position;

a cap withdrawing tool movably mounted on the guide frame, said cap withdrawing tool being movable along a crosswise direction that is perpendicular with respect to both the tip and the recessed portion when the tip of the welding electrode is in the engaged position, said tool having two facing wall sections each having a wedge provided with a knife edge that is inserted in the peripheral hollow joint when the tool is moved toward the tip of the electrode that is in the engaged position, said knife edge of the wedge being forced into the back surface of the cap for removing the cap from the shank when the tool is moved toward the tip of the electrode; and a driving mechanism coupled to the cap withdrawing tool for moving the cap withdrawing tool toward and away from the tip of the welding electrode along the crosswise direction between an open position where the tip of the electrode is inserted into and removed from the recessed portion of the guide frame and a closed position where the wedge removes the cap from the shank.

* * * * *